(12) United States Patent
Jang et al.

(10) Patent No.: US 11,220,260 B2
(45) Date of Patent: Jan. 11, 2022

(54) APPARATUS AND METHOD FOR CONTROLLING SAFETY EQUIPMENT OF VEHICLE

(71) Applicants: Hyundai Motor Company, Seoul (KR); Kia Motors Corporation, Seoul (KR)

(72) Inventors: Jae Myeong Jang, Yongin-si (KR); Se Kyung Choi, Seongnam-si (KR); Min Seok Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 16/653,230

(22) Filed: Oct. 15, 2019

(65) Prior Publication Data
US 2021/0001842 A1   Jan. 7, 2021

(30) Foreign Application Priority Data
Jul. 1, 2019   (KR) .................. 10-2019-0078876

(51) Int. Cl.
| | | |
|---|---|---|
| *B60W 30/00* | (2006.01) | |
| *B60W 30/095* | (2012.01) | |
| *B62D 15/02* | (2006.01) | |
| *B60W 40/107* | (2012.01) | |
| *B60W 40/09* | (2012.01) | |
| *B60W 40/109* | (2012.01) | |

(52) U.S. Cl.
CPC ........ *B60W 30/0953* (2013.01); *B60W 40/09* (2013.01); *B60W 40/107* (2013.01); *B60W 40/109* (2013.01); *B62D 15/0265* (2013.01); *B60W 2420/00* (2013.01)

(58) Field of Classification Search
CPC .......... B60W 30/0953; B60W 40/107; B60W 40/09; B60W 40/109; B60W 2420/00; B62D 15/0265; B62D 15/025
See application file for complete search history.

(56) References Cited

U.S. PATENT DOCUMENTS

| | | | |
|---|---|---|---|
| 8,463,500 B2 * | 6/2013 | Cuddihy | ........... B60R 21/01554 701/45 |
| 9,150,224 B2 * | 10/2015 | Yopp | ..................... B60W 50/10 |
| 9,317,033 B2 * | 4/2016 | Ibanez-Guzman | ......................... B60W 60/0025 |
| 9,342,074 B2 * | 5/2016 | Dolgov | ................ G05D 1/0061 |

(Continued)

*Primary Examiner* — Peter D Nolan
*Assistant Examiner* — Peter Y Ning
(74) *Attorney, Agent, or Firm* — Slater Matsil, LLP

(57) ABSTRACT

According to an embodiment of the present disclosure, a safety equipment controlling apparatus of a vehicle may include an acceleration sensor, a collision detection sensor, a brake controller, a steering controller, an airbag, a seat belt actuator, and a control circuit electrically connected to the acceleration sensor, the collision detection sensor, the brake controller, the steering controller, the airbag, and the seat belt actuator. The control circuit may be configured to obtain a longitudinal acceleration and a lateral acceleration, which are generated by a brake of the brake controller and a steering of the steering controller, using the acceleration sensor and to calculate a predicted behavior of a user of the vehicle, based on the longitudinal acceleration and the lateral acceleration.

9 Claims, 10 Drawing Sheets

(56) References Cited

U.S. PATENT DOCUMENTS

| | | | |
|---|---|---|---|
| 2005/0087381 A1* | 4/2005 | Tobata | B60R 21/013 |
| | | | 180/271 |
| 2006/0253240 A1* | 11/2006 | Rao | B60W 50/0205 |
| | | | 701/48 |
| 2008/0243327 A1* | 10/2008 | Bujak | B60W 30/12 |
| | | | 701/33.7 |
| 2010/0198491 A1* | 8/2010 | Mays | B60W 30/09 |
| | | | 701/124 |
| 2014/0156134 A1* | 6/2014 | Cullinane | B60W 50/082 |
| | | | 701/23 |
| 2014/0249722 A1* | 9/2014 | Hegemann | G08G 1/166 |
| | | | 701/41 |
| 2014/0343799 A1* | 11/2014 | Hashimoto | B60W 10/184 |
| | | | 701/48 |
| 2015/0298636 A1* | 10/2015 | Furst | B60R 22/00 |
| | | | 701/45 |
| 2016/0001781 A1* | 1/2016 | Fung | B60K 28/02 |
| | | | 701/36 |
| 2016/0355192 A1* | 12/2016 | James | B60R 11/04 |
| 2016/0358453 A1* | 12/2016 | Wassef | G08B 6/00 |
| 2016/0375912 A1* | 12/2016 | Christensen | B60W 30/143 |
| | | | 701/25 |
| 2017/0102700 A1* | 4/2017 | Kozak | G05D 1/0061 |
| 2017/0137023 A1* | 5/2017 | Anderson | B60W 50/14 |
| 2017/0368936 A1* | 12/2017 | Kojima | B60W 40/09 |
| 2018/0141568 A1* | 5/2018 | Singhal | A61B 5/01 |
| 2018/0290686 A1* | 10/2018 | Minoiu Enache | B60W 30/09 |

* cited by examiner

APPARATUS AND METHOD FOR CONTROLLING SAFETY EQUIPMENT OF VEHICLE

CROSS-REFERENCE TO RELATED APPLICATIONS

This application claims priority to Korean Patent Application No. 10-2019-0378876, filed in the Korean Intellectual Property Office on Jul. 1, 2019, which application is hereby incorporated herein by reference.

TECHNICAL FIELD

The present disclosure relates to an apparatus and a method for controlling safety equipment of a vehicle.

BACKGROUND

With the development of the automotive industry, an autonomous driving system and a driving assistance system which enables partly autonomous driving are being developed. The driving assistance system may provide various functions such as velocity settings, the maintaining of an inter-vehicle distance, lane departure avoidance, forward collision avoidance, and changing lanes. In particular, the lane departure avoidance function and the forward collision avoidance function may actively protect a driver and a passenger from colliding with external objects. For example, the lane departure avoidance function may prevent the collision due to lane departure by means of steering control. The forward collision avoidance function may prevent collisions with objects in front by means of deceleration control. In the meantime, a seat belt and an airbag system may be mounted in the vehicle to protect the driver and the passenger from impact when the collision occurs.

SUMMARY

The user (a driver and a passenger) of a vehicle may be protected by a driving assistance system for collision avoidance before a collision occurs and may be protected by an airbag system to mitigate shock after the collision has occurred. When the driving assistance system is operating, the user's location may be changed due to the acceleration not predicted by the user. When the user's location is changed, the protection effect may be significantly reduced even though the airbag system operates. That is, the user may not be protected by the airbag system due to the operation of the driving assistance system. Accordingly, the control strategy may be required to efficiently operate the safety equipment of the vehicle depending on the user's behavior.

The present disclosure can solve above-mentioned problems occurring in the prior art while advantages achieved by the prior art are maintained intact.

An aspect of the present disclosure provides an apparatus and a method that may predict a user's behavior due to the operation of a driving assistance system and may effectively operate safety equipment depending on the predicted result.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a safety equipment controlling apparatus of a vehicle may include an acceleration sensor, a collision detection sensor, a brake controller, a steering controller, an airbag, a seat belt actuator, and a control circuit electrically connected to the acceleration sensor, the collision detection sensor, the brake controller, the steering controller, the airbag, and the seat belt actuator. The control circuit may be configured to obtain a longitudinal acceleration and a lateral acceleration, which are generated by a brake of the brake controller and a steering of the steering controller, using the acceleration sensor and to calculate a predicted behavior of a user of the vehicle, based on the longitudinal acceleration and the lateral acceleration.

According to an embodiment, the control circuit may be configured to determine whether the predicted behavior is greater than a specified displacement.

According to an embodiment, the control circuit may be configured to calculate a collision severity of the vehicle based on an acceleration obtained by the collision detection sensor.

According to an embodiment, the control circuit may be configured to adjust a deployment time point of the airbag when the predicted behavior is greater than the specified displacement and the collision severity is higher than a specified level.

According to an embodiment, the control circuit may be configured to change a deployment condition of the airbag to adjust the deployment time point.

According to an embodiment, the control circuit may be configured to deploy the airbag when the changed deployment condition is satisfied.

According to an embodiment, the control circuit may be configured to drive the seat belt actuator with a first driving force such that a seat belt of the vehicle is tightened, when the predicted behavior is greater than the specified displacement and the collision severity is lower than a specified level.

According to an embodiment, the control circuit may be configured to drive the seat belt actuator with a second driving force lower than the first driving force, when the predicted behavior is less than the specified displacement and the collision severity is lower than the specified level.

According to an embodiment, the apparatus may further include a suspension. The control circuit may be configured to adjust a height of the suspension based on the predicted behavior.

According to an embodiment, the apparatus may further include a power seat. The control circuit may be configured to adjust a location of the power seat based on the predicted behavior.

According to another aspect of the present disclosure, a method of controlling safety equipment of a vehicle may include obtaining a longitudinal acceleration and a lateral acceleration, which are generated by a brake of a brake controller of the vehicle and a steering of a steering controller of the vehicle, using an acceleration sensor of the vehicle and calculating a predicted behavior of a user of the vehicle, based on the longitudinal acceleration and the lateral acceleration.

According to an embodiment, the method may further include determining whether the predicted behavior is greater than a specified displacement.

According to an embodiment, the method may further include calculating a collision severity of the vehicle based on an acceleration obtained by a collision detection sensor of the vehicle.

According to an embodiment, the method may further include adjusting a deployment time point of the airbag when the predicted behavior is greater than the specified displacement and the collision severity is higher than a specified level.

According to an embodiment, the method may further include driving a seat belt actuator such that a seat belt of the vehicle is tightened, when the predicted behavior is greater than the specified displacement and the collision severity is lower than a specified level.

According to another aspect of the present disclosure, an apparatus for use with a vehicle, the apparatus comprising: an acceleration sensor; a collision detection sensor; a brake controller; a steering controller; an airbag; a seat belt actuator; and a control circuit electrically connected to the acceleration sensor, the collision detection sensor, the brake controller, the steering controller, the airbag, and the seat belt actuator, wherein the control circuit is configured to: obtain a longitudinal acceleration and a lateral acceleration, which are generated by a brake of the brake controller and a steering of the steering controller, using the acceleration sensor; calculate a predicted behavior of a user of the vehicle based on the longitudinal acceleration and the lateral acceleration; determine whether the predicted behavior is greater than a specified displacement; calculate a collision severity of the vehicle based on an acceleration obtained by the collision detection sensor; adjust a deployment time point of the airbag when the predicted behavior is greater than the specified displacement and the collision severity is higher than a specified level; and drive the seat belt actuator with a first driving force such that a seat belt of the vehicle is tightened when the predicted behavior is greater than the specified displacement and the collision severity is lower than a specified level.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
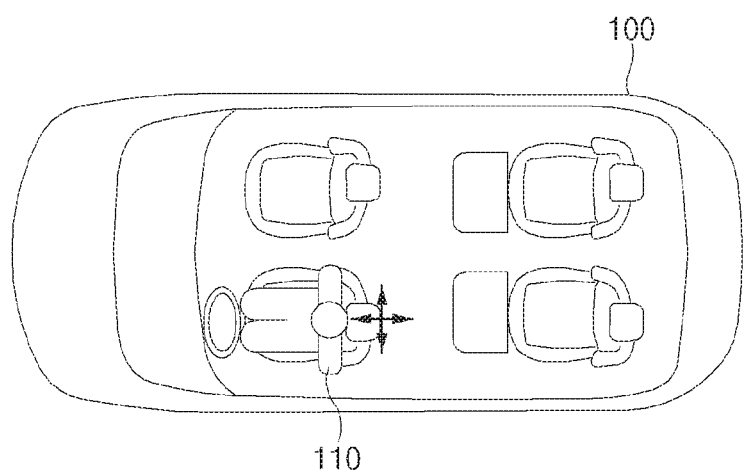
FIG. 1 illustrates an operating environment of a safety equipment controlling apparatus of a vehicle, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates an operating environment of a safety equipment controlling apparatus of a vehicle, according to an embodiment of the present disclosure.

Referring to FIG. 1, a driver no may drive a vehicle 100 according to an embodiment. For example, the vehicle 100 may include an automatic brake controller and an automatic steering controller. The automatic brake controller and the automatic steering controller may perform deceleration control and steering control based on the data obtained by a sensor.

When the deceleration control and/or the steering control is performed by the automatic brake controller and/or the automatic steering controller, the body of the driver no may move longitudinally and/or laterally by inertia. When the vehicle 100 crashes and then the airbag system mounted in the vehicle 100 is operated in a state where the body of the driver no moves, the protection efficiency of the airbag system may be reduced significantly. Accordingly, when the control is performed by the automatic brake controller and/or the automatic steering controller, there is a need to predict the behavior of the driver 110 according to the control and to control the safety equipment mounted in the vehicle 100 depending on the predicted result. For example, the vehicle 100 may adjust the location of the driver 110, using a seat belt, a suspension, and/or a power seat and may adjust the deployment time point of the airbag to a faster time point.

Hereinafter, for the purpose of controlling the safety equipment such as a seat belt, an airbag, and the like, the detailed operation of the vehicle wo will be described in detail with reference to FIGS. 2 to 7.

Figure 2:
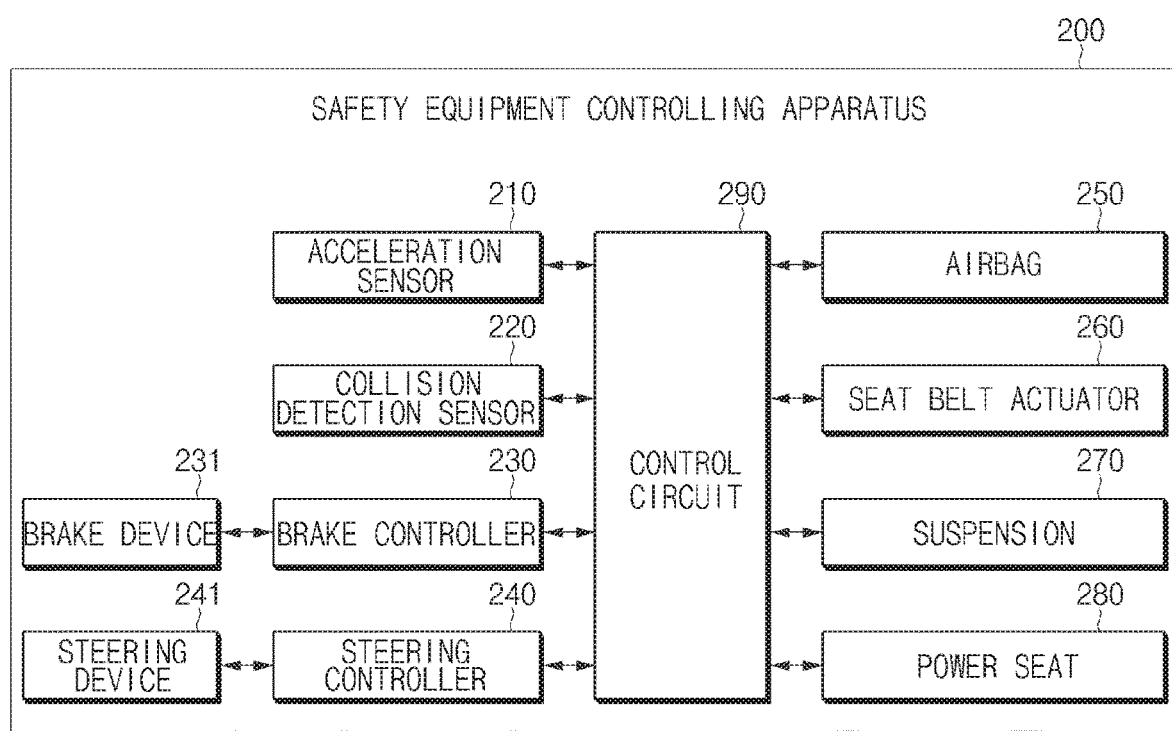
FIG. 2 is a block diagram illustrating a configuration of a safety equipment controlling apparatus of a vehicle, according to an embodiment of the present disclosure.

FIG. 2 is a block diagram illustrating a configuration of a safety equipment controlling apparatus of a vehicle, according to an embodiment of the present disclosure.

Referring to FIG. 2, a safety equipment controlling apparatus 200 according to an embodiment may include an acceleration sensor 210, a collision detection sensor 220, a brake controller 230, a brake device 231, a steering controller 240, a steering device 241, an airbag 250, a seat belt actuator 260, a suspension 270, a power seat 280, and a control circuit 290. The safety equipment controlling apparatus 200 may be mounted in a vehicle. In this specification, a user may include a driver and a passenger.

The acceleration sensor 210 may sense the acceleration of the vehicle. The acceleration sensor 210 may sense the longitudinal acceleration and lateral acceleration of the vehicle. In this specification, the acceleration may have any direction including the front, the rear, and the side of the vehicle. For example, the acceleration sensor 210 may include an inertial measurement unit (IMU).

The collision detection sensor 220 may sense the collision of the vehicle. For example, the collision detection sensor 220 may sense the deceleration of the vehicle and may determine whether the vehicle collides with an external object.

The brake controller 230 may automatically control the deceleration of the vehicle. For example, the brake controller 230 may automatically control the brake device 231 based on information obtained by the radar and the camera mounted in the vehicle. For example, when the risk of the forward collision is detected, the brake controller 230 may perform emergency brake. The brake device 231 may be manually controlled by the user.

The steering controller 240 may automatically control the direction of the vehicle. For example, the steering controller 240 may automatically control the steering device 241 based on information obtained by the radar and the camera mounted in the vehicle. For example, when lane departure is detected, the steering controller 240 may perform steering control. The steering device 241 may be manually controlled by the user.

The airbag 250 may be configured to protect the user when the vehicle collides. For example, the airbag 250 may be deployed when the collision of specific strength or more occurs.

The seat belt actuator 260 may be connected to the seat belt of the vehicle. For example, the seat belt actuator 260 may be driven to tighten or loosen the seat belt.

The suspension 270 may be configured to absorb the shock applied to the vehicle. The height of the suspension 270 may be controlled by the control circuit 290.

The power seat 280 may be moved in response to an electrical signal. The power seat 280 may be moved by the movement of the motor included in the power seat 280. For example, the location and height of the power seat 280 may be changed; the location and angle of each of the backrest and the headrest included in the power seat 280 may be changed.

The control circuit 290 may be electrically connected to the acceleration sensor 210, the collision detection sensor 220, the brake controller 230, the brake device 231, the steering controller 240, the steering device 241, the airbag 250, the seat belt actuator 260, the suspension 270, and the power seat 280. The control circuit 290 may control the acceleration sensor 210, the collision detection sensor 220, the brake controller 230, the brake device 231, the steering controller 240, the steering device 241, the airbag 250, the seat belt actuator 260, the suspension 270, and the power seat 280 and may process and compute a variety of data. The control circuit 290 may include, for example, an electronic control unit (ECU), a micro controller unit (MCU), and/or a sub-controller, which is mounted in the vehicle.

According to an embodiment, the control circuit 290 may obtain the longitudinal acceleration and lateral acceleration that are generated by the brake of the brake controller 230 and the steering of the steering controller 240, using the acceleration sensor 210. For example, the control circuit 290 may monitor the operations of the brake controller 230 and the steering controller 240. The control circuit 290 may detect the operations of the brake controller 230 and the steering controller 240, by monitoring the operation command signal of each of the brake controller 230 and the steering controller 240. The control circuit 290 may monitor the operation command signal through the message of controller area network (CAN). That is, the control circuit 290 may detect the longitudinal acceleration and the lateral acceleration, which are generated by the automatic control, using the acceleration sensor 210.

According to an embodiment, the control circuit 290 may calculate the predicted behavior of the user of the vehicle based on the longitudinal acceleration and the lateral acceleration. The control circuit 290 may calculate a user's predicted location by inertia when the longitudinal acceleration and the lateral acceleration are generated by the automatic control. For example, the control circuit 290 may calculate a user's predicted location, using the second order differential equation modeled depending on the spring-damping system.

According to an embodiment, the control circuit 290 may determine whether the predicted behavior is greater than a specified displacement. The specified displacement may be set based on the displacement between the user and the interior material of the vehicle.

According to an embodiment, the control circuit 290 may calculate the collision severity of the vehicle based on the acceleration obtained by the collision detection sensor 220. In a situation where the collision occurs (or in a situation where the collision of intensity requiring the deployment of the airbag 250 occurs), the collision severity may be calculated to be higher than a specified level; in a situation before the collision occurs (or in a situation before the collision of intensity requiring the deployment of the airbag 250 occurs), the collision severity may be calculated to be lower than the specified level. In detail, a method of calculating the collision severity will be described with reference to FIGS. 4 and 5.

According to an embodiment, the control circuit 290 may drive the seat belt actuator 260 such that the seat belt of the vehicle is tightened, when the user's predicted behavior is greater than the specified displacement and the collision severity is lower than the specified level. The control circuit 290 may drive the seat belt actuator 260 such that the user returns to the original location using the seat belt. Accordingly, the control circuit 290 may return the user to the original location before the collision occurs. When the user's predicted behavior is greater than the specified displacement, the control circuit 290 may drive the seat belt actuator 260 with the maximum driving force of the seat belt actuator 260.

According to an embodiment, the control circuit 290 may drive the seat belt actuator 260 with the relatively low driving force, when the predicted behavior is less than the specified displacement and the collision severity is less than the specified level. Because the control circuit 290 returns the user to the original location by the relatively low driving force, when the user's predicted behavior is less than the specified displacement, the control circuit 290 may drive the seat belt actuator 260 with the relatively low driving force. For example, the control circuit 290 may drive the seat belt actuator 260 with half of the maximum driving force of the seat belt actuator 260. In detail, the driving force of the seat belt actuator 260 will be described with reference to FIG. 6.

According to an embodiment, the control circuit 290 may adjust the height of the suspension 270 and/or the location of the power seat 280 based on the user's predicted behavior when the collision severity is lower than the specified level. The control circuit 290 may return the user to the original location, by adjusting the height of the suspension 270 and/or the location of the power seat 280. Accordingly, the control circuit 290 may return the user to the original location before the collision occurs.

As described in FIG. 2, in a situation where the collision severity is low (or before the collision occurs), the control circuit 290 may move the user, which has been moved by the longitudinal acceleration and/or the lateral acceleration, to the original location using the seat belt actuator 260, the suspension 270, and/or the power seat 280.

According to an embodiment, the control circuit 290 may adjust the deployment time point of the airbag 250 when the predicted behavior is greater than the specified displacement and the collision severity is higher than the specified level. When the collision severity is higher than the specified level, the collision of the extent to which the airbag 250 needs to be deployed may occur. When the user's behavior is predicted, the control circuit 290 may advance the deployment time point of the airbag 250 to protect the user. The control circuit 290 may change the deployment condition of the airbag 250 to adjust the deployment time point. The change of the deployment condition of the airbag 250 will be described in detail with reference to FIG. 7. When the changed deployment condition is satisfied, the control circuit 290 may deploy the airbag 250. Because the deployment time point of the airbag 250 is advanced by the changed deployment condition, even though the user's movement occurs by the longitudinal acceleration and/or the lateral acceleration, the user may be sufficiently protected by the airbag 250.

Figure 3:
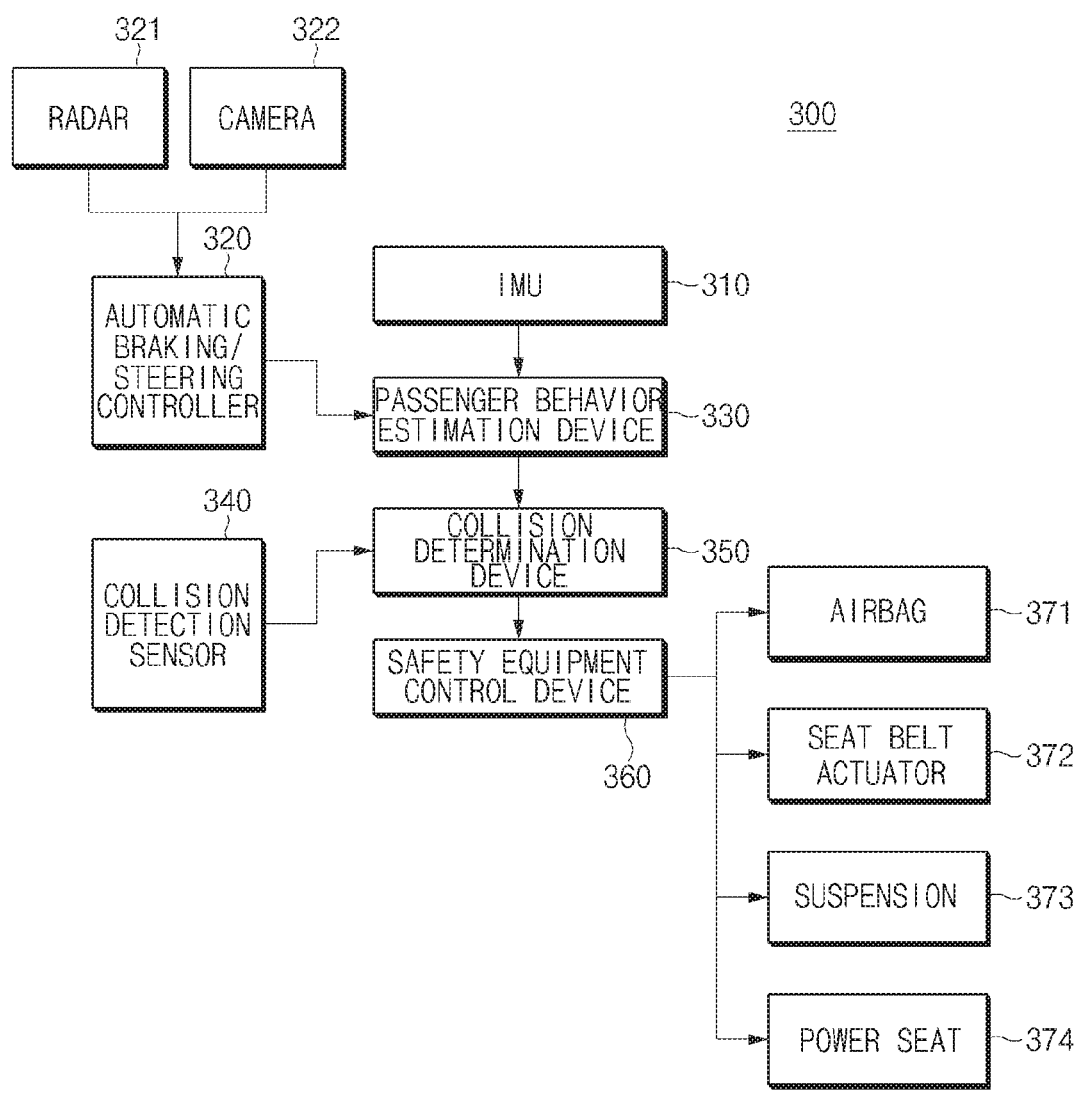
FIG. 3 is a block diagram illustrating a configuration of a safety equipment controlling apparatus of a vehicle, according to an embodiment of the present disclosure.

FIG. 3 is a block diagram illustrating a configuration of a safety equipment controlling apparatus of a vehicle, according to an embodiment of the present disclosure.

Referring to FIG. 3, a safety equipment controlling apparatus 300 according to an embodiment may include an IMU 310, an automatic braking/steering controller 320, a radar 321, a camera 322, a passenger behavior estimation device 330, a collision detection sensor 340, a collision determination device 350, a safety equipment control device 360, an airbag 371, a seat belt actuator 372, a suspension 373, and a power seat 374.

The IMU 310 may detect the longitudinal acceleration and lateral acceleration of a vehicle. The automatic braking/steering controller 320 may perform automatic brake control and automatic steering control based on the data obtained by the radar 321 and the camera 322. The passenger behavior estimation device 330 may obtain the longitudinal acceleration and the lateral acceleration, which are generated by the brake and steering, and may secondarily obtain the operating mode information of the automatic braking/steering controller 320 to reflect the difference in the user's behavior according to the operation pattern of the automatic braking/steering controller 320. The passenger behavior estimation device 330 may estimate the user's behavior based on the obtained information.

The collision determination device 350 may determine the collision severity based on the data obtained from the collision detection sensor 340. The safety equipment control device 360 may control the airbag 371, the seat belt actuator 372, the suspension 373, and/or the power seat 374 based on the user's behavior estimated by the passenger behavior estimation device 330 and the collision severity determined by the collision determination device 350. For example, the safety equipment control device 360 may return the user's location to the original location, by controlling the seat belt actuator 372, the suspension 373, and/or the power seat 374 in a situation before the collision occurs. For another example, the safety equipment control device 360 may advance the deployment time point of the airbag 371 by changing the deployment condition of the airbag 371 in a situation after the collision occurs. Accordingly, the protection efficiency of the user of the safety equipment may be improved.

Figure 4:
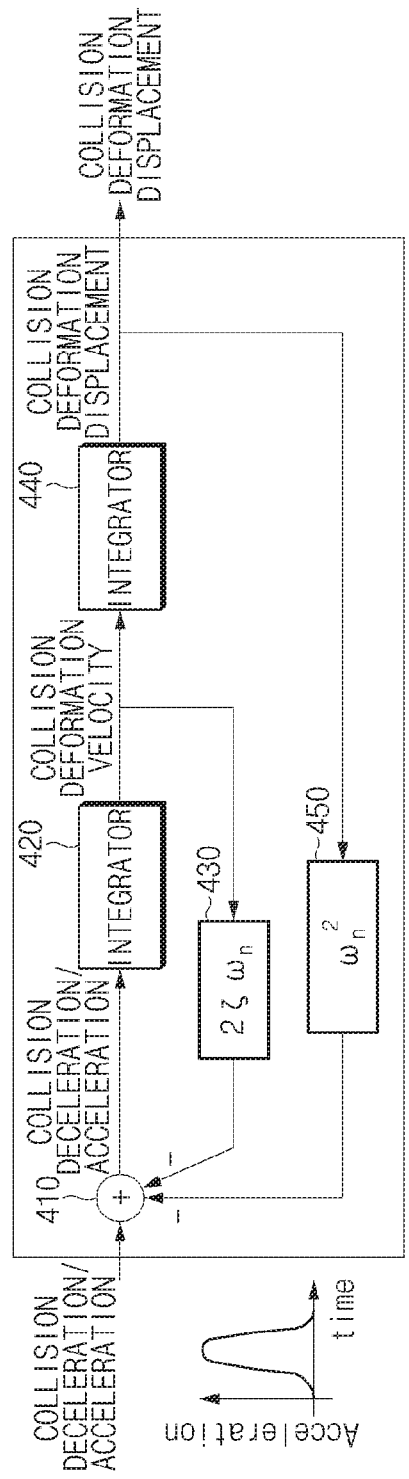
FIG. 4 is a view for describing an exemplary operation of a safety equipment controlling apparatus of a vehicle, according to an embodiment of the present disclosure.

FIG. 4 is a view for describing an exemplary operation of a safety equipment controlling apparatus of a vehicle, according to an embodiment of the present disclosure.

Referring to FIG. 4, a vehicle according to an embodiment may obtain collision deceleration/acceleration from a collision sensor. The obtained collision deceleration/acceleration may be used as an input value. The vehicle may calculate the collision severity, using the second order differential equation modeled depending on the spring-damping system.

The collision deceleration/acceleration may be provided as the input to an adder 410. The adder 410 may output the collision deceleration/acceleration; an integrator 420 may output a collision deformation velocity by integrating the collision deceleration/acceleration. The collision deformation velocity may be fed back to the adder 410 through an inverting amplifier 430 (gain=$-2\zeta\omega_n$). An integrator 440 may output a collision deformation displacement by integrating the collision deformation velocity. The collision deformation displacement may be fed back to the adder 410 through an inverting amplifier 450 (gain=$-\omega_n^2$). Accordingly, the collision deformation velocity and the collision deformation displacement may be calculated to determine the collision severity.

Figure 5:
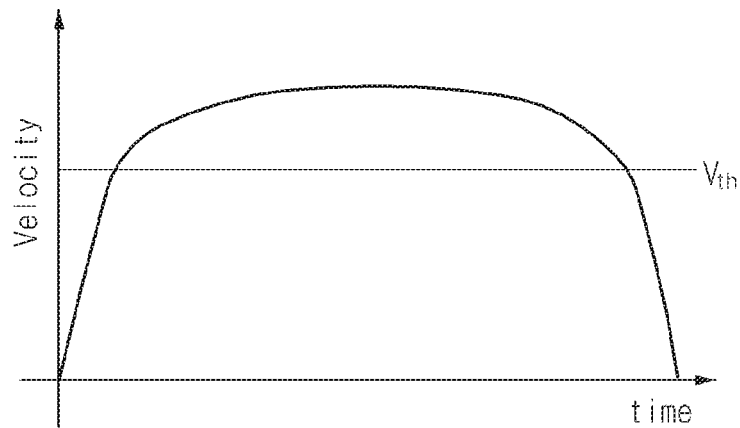
FIG. 5 is a view for describing an exemplary operation of a safety equipment controlling apparatus of a vehicle, according to an embodiment of the present disclosure.
Figure 5:
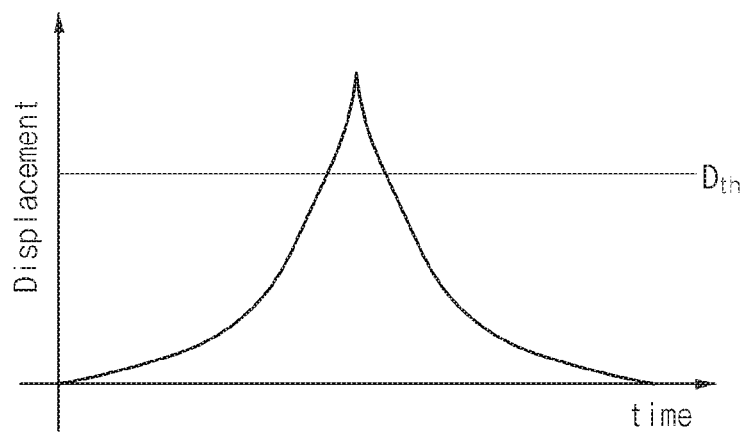

FIG. 5 is a view for describing an exemplary operation of a safety equipment controlling apparatus of a vehicle, according to an embodiment of the present disclosure.

Referring to FIG. 5, a vehicle according to an embodiment may determine collision severity based on a collision deformation velocity and a collision deformation displacement described with reference to FIG. 4. For example, the vehicle may determine whether the collision severity is high, when the collision deformation velocity is higher than a specified value Vth and the collision deformation displacement is higher than a specified value Dth. For another example, the vehicle may determine whether the collision severity is low, when the collision deformation velocity is lower than the specified value Vth and the collision deformation displacement is lower than the specified value Dth. When the collision severity is high, the vehicle may improve safety by adjusting the deployment time point of an airbag. When the collision severity is low, the vehicle may improve safety by returning a user to the original location using a seat belt, a suspension, and/or a power seat.

Figure 6:
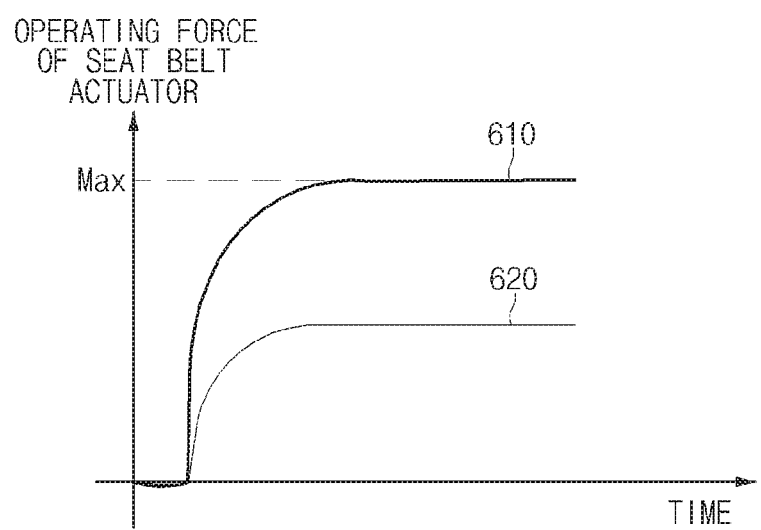
FIG. 6 is a view for describing an exemplary operation of a safety equipment controlling apparatus of a vehicle, according to an embodiment of the present disclosure.

FIG. 6 is a view for describing an exemplary operation of a safety equipment controlling apparatus of a vehicle, according to an embodiment of the present disclosure.

Referring to FIG. 6, when a user's predicted behavior exceeds a specified range and the collision severity is lower than a specified level, a vehicle according to an embodiment may drive a seat belt actuator to return the user to an original location. The vehicle may adjust the driving force of the seat belt actuator depending on the user's location.

For example, when the vehicle predicts that the displacement between the user and the interior material of the vehicle is greater than a specified value due to the user's behavior, as illustrated in a first curve 610, the vehicle may drive the seat belt actuator with the maximum operating force to strongly restrict the user's behavior.

For example, when the vehicle predicts that the displacement between the user and the interior material of the vehicle is less than the specified value even though the user's behavior occurs, as illustrated in a second curve 620, the vehicle may drive the seat belt actuator with half of the maximum operating force to relatively weakly restrict the user's behavior.

Figure 7:
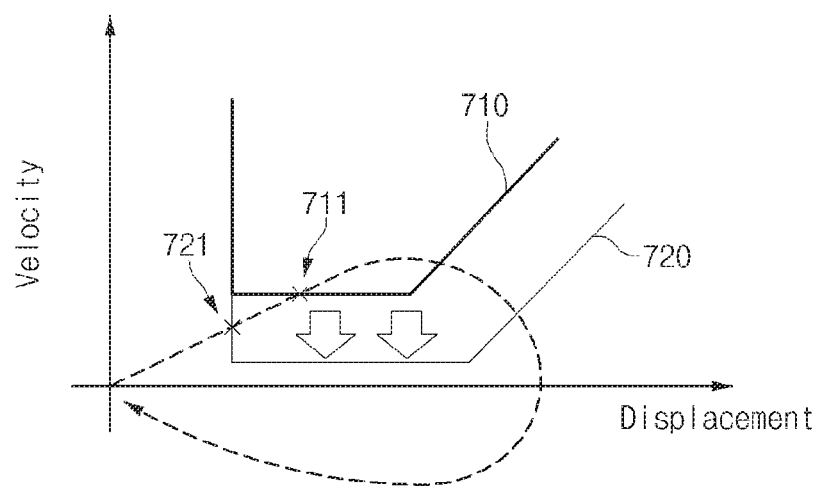
FIG. 7 is a view for describing an exemplary operation of a safety equipment controlling apparatus of a vehicle, according to an embodiment of the present disclosure.

FIG. 7 is a view for describing an exemplary operation of a safety equipment controlling apparatus of a vehicle, according to an embodiment of the present disclosure.

Referring to FIG. 7, when collision severity is higher than a specified level, a vehicle according to an embodiment may adjust the deployment time point of an airbag to protect a user. The vehicle may advance the deployment time point of the airbag by adjusting the deployment condition of the airbag.

For example, the vehicle may deploy the airbag when the deployment condition according to a first curve 710 is satisfied. When the deployment condition according to the first curve 710 is applied, the airbag of the vehicle may be deployed at a first time point 711. The vehicle may change the deployment condition from the first curve 710 to a second curve 720 to advance the deployment time point of the airbag.

The vehicle may deploy the airbag when the deployment condition according to the second curve 720 is satisfied. When the deployment condition according to the second curve 720 is applied, the airbag of the vehicle may be deployed at a second time point 721. When the collision severity of the vehicle is higher than the specified level, the deployment time point of the airbag may be advanced by changing the deployment condition of the airbag. Accordingly, the protection of the user by the airbag may be enhanced even though the user's behavior occurs due to automatic brake and automatic steering.

Figure 8:
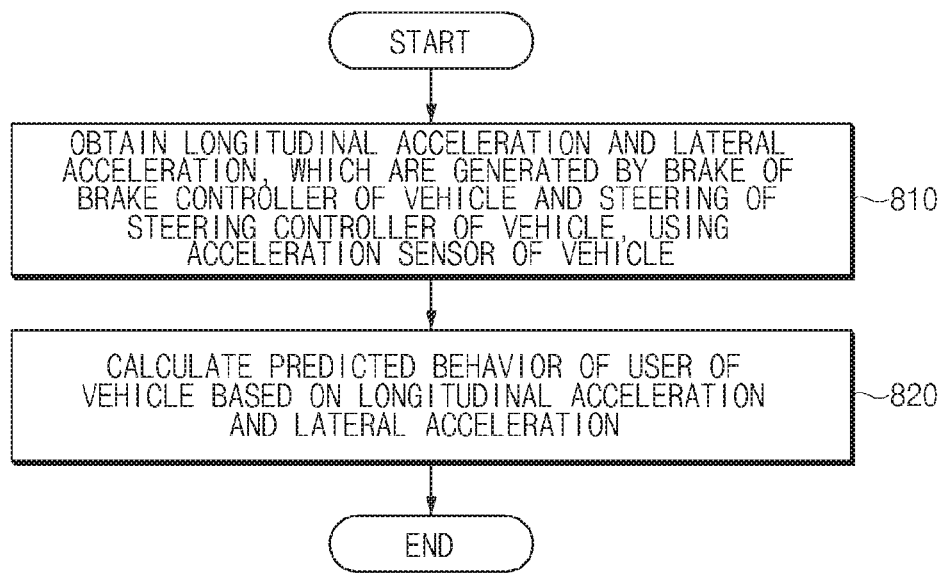
FIG. 8 is a flowchart for describing a safety equipment controlling method of a vehicle, according to an embodiment of the present disclosure.

FIG. 8 is a flowchart for describing a safety equipment controlling method of a vehicle, according to an embodiment of the present disclosure.

Hereinafter, it is assumed that a vehicle including the safety equipment controlling apparatus 200 of FIG. 2 performs the process of FIG. 8. In addition, in a description of FIG. 8, it may be understood that an operation described as being performed by a vehicle is controlled by the control circuit 290 of the safety equipment controlling apparatus 200.

Referring to FIG. 8, in operation 810, the vehicle may obtain the longitudinal acceleration and the lateral acceleration, which are generated by the brake of the brake controller and the steering of the steering controller, using the acceleration sensor of a vehicle. For example, the vehicle may obtain the acceleration generated by the automatic brake control and/or the automatic steering control.

In operation 820, the vehicle may calculate the predicted behavior of a user of the vehicle based on the longitudinal acceleration and the lateral acceleration. For example, the vehicle may predict the user's behavior caused by inertia as acceleration is applied. When the user's behavior is predicted, the vehicle may return the user to an original location by driving a seat belt actuator before collision occurs; the vehicle may advance the deployment time point of the airbag by adjusting the deployment condition of the airbag after the collision occurs.

Figure 9:
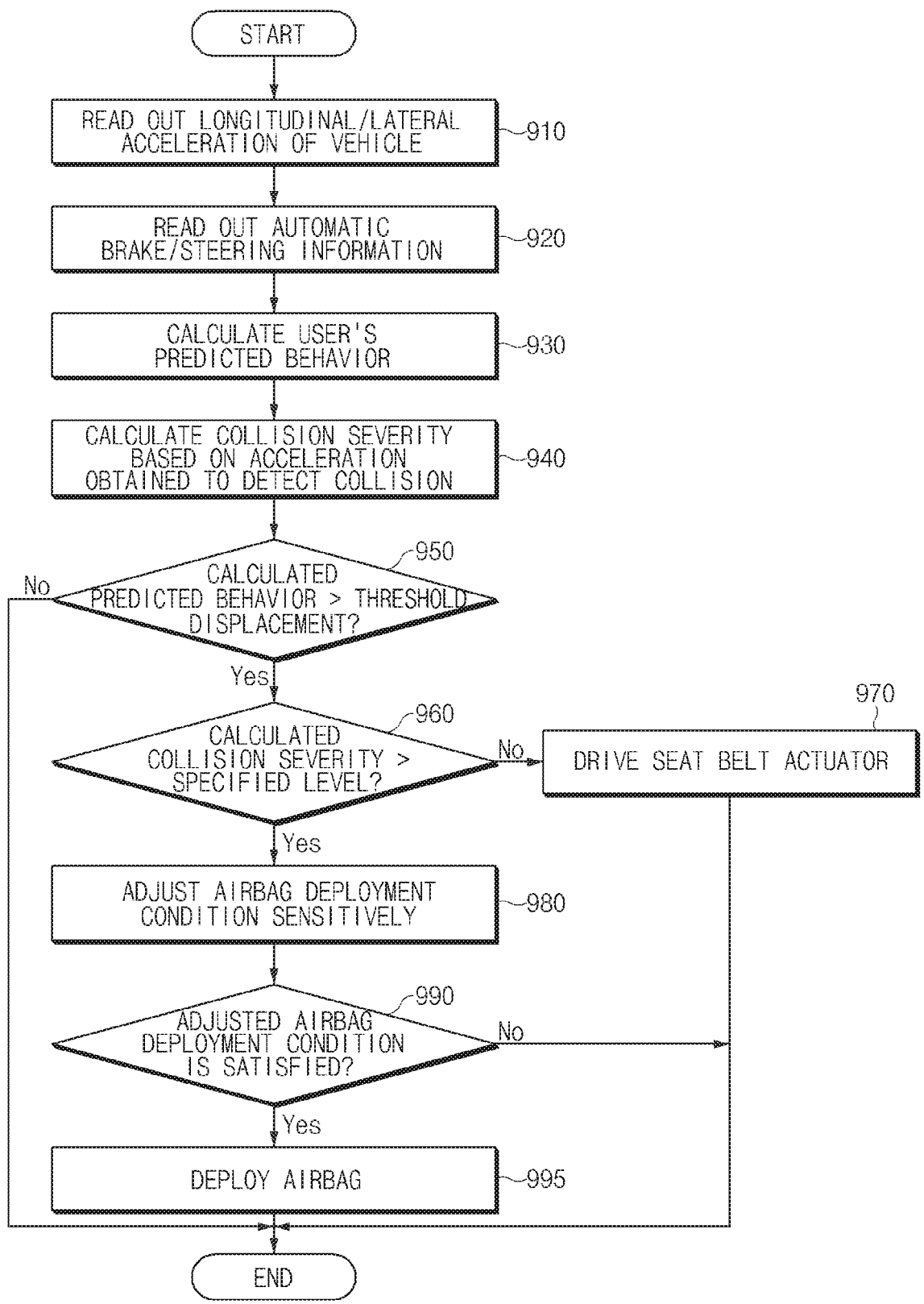
FIG. 9 is a flowchart for describing a safety equipment controlling method of a vehicle, according to an embodiment of the present disclosure.

FIG. 9 is a flowchart for describing a safety equipment controlling method of a vehicle, according to an embodiment of the present disclosure.

Hereinafter, it is assumed that a vehicle including the safety equipment controlling apparatus 200 of FIG. 2 performs the process of FIG. 9. In addition, in a description of FIG. 9, it may be understood that an operation described as being performed by a vehicle is controlled by the control circuit 290 of the safety equipment controlling apparatus 200.

Referring to FIG. 9, in operation 910, the vehicle may read out the longitudinal/lateral acceleration of the vehicle. In operation 920, the vehicle may read out automatic brake/steering information. In operation 930, the vehicle may calculate a user's predicted behavior based on the longitudinal/lateral acceleration and automatic brake/steering information. In operation 940, the vehicle may calculate the collision severity based on the acceleration obtained to detect the collision.

In operation 950, the vehicle may determine whether the calculated predicted behavior exceeds a threshold displacement. When the calculated predicted behavior exceeds the threshold displacement, in operation 960, the vehicle may determine whether the calculated collision severity exceeds a specified level.

When the calculated collision severity is less than or equal to the specified level, in operation 970, the vehicle may drive a seat belt actuator. When the user is returned to the original location by the seat belt actuator, the vehicle may deploy the airbag without the change of the deployment condition of the airbag when the general deployment condition is satisfied.

When the calculated collision severity exceeds the specified level, in operation 980, the vehicle may sensitively adjust the airbag deployment condition to advance the airbag deployment time point. In operation 990, the vehicle may determine whether the adjusted airbag deployment condition is satisfied. When the adjusted airbag deployment condition is satisfied, in operation 995, the vehicle may deploy the airbag.

An embodiment is exemplified in FIG. 9 as operations 910 to 995 are performed sequentially, but the present disclosure is not limited thereto. For example, the order of operations 910 to 995 may be changed variously.

Figure 10:
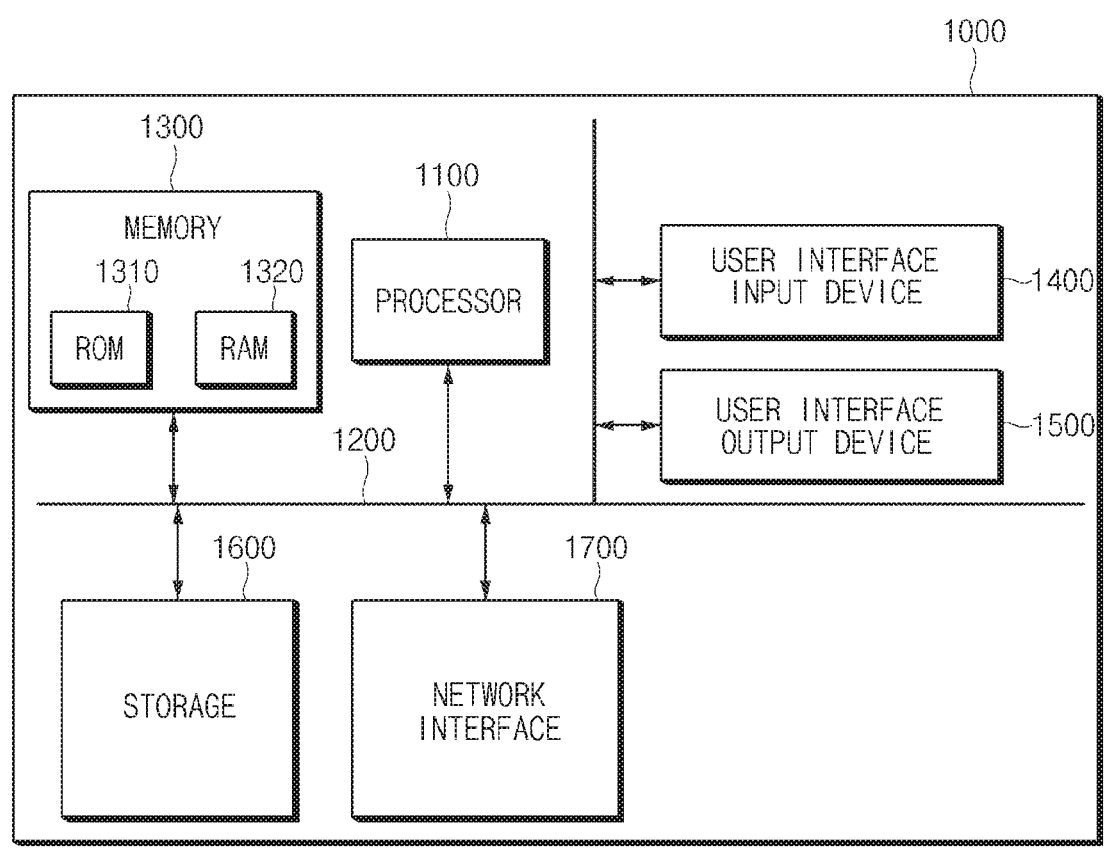
FIG. 10 illustrates a computing system, according to an embodiment of the present disclosure.

FIG. 10 illustrates a computing system according to an embodiment of the present disclosure.

Referring to FIG. 10, the method according to an embodiment of the present disclosure may be implemented through the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present disclosure may predict a user's behavior according to the operation of a brake controller, a steering controller, and the like and then may operate the safety equipment of a vehicle depending on the predicted result, thereby improving the effect of user protection by the safety equipment when a collision occurs.

Furthermore, when the user's behavior exceeding a specified range is predicted, the present disclosure may limit the change of the user's location in a dangerous situation by controlling a seat belt, a suspension, and/or a power seat.

Moreover, when the user's behavior is predicted and collision severity is high, the present disclosure may adjust the deployment time point of an airbag to the faster time point, thereby improving the effect of user protection by the airbag when a collision occurs.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for use with a vehicle, the apparatus comprising:
    an acceleration sensor;
    a collision detection sensor;
    a brake controller;
    a steering controller;
    an airbag;
    a seat belt actuator; and
    a control circuit electrically connected to the acceleration sensor, the collision detection sensor, the brake controller, the steering controller, the airbag, and the seat belt actuator, wherein the control circuit is configured to:
        obtain a longitudinal acceleration and a lateral acceleration, which are generated by a brake of the brake controller and a steering of the steering controller, using the acceleration sensor;
        calculate a predicted behavior of a user of the vehicle based on the longitudinal acceleration and the lateral acceleration;
        calculate a collision severity of the vehicle based on an acceleration obtained by the collision detection sensor;
        adjust a deployment time point of the airbag when the predicted behavior is greater than a specified displacement and the collision severity is higher than a specified level;
        drive the seat belt actuator with a first driving force such that a seat belt of the vehicle is tightened when the predicted behavior is greater than the specified displacement and the collision severity is lower than a specified level; and
        drive the seat belt actuator with a second driving force lower than the first driving force when the predicted behavior is less than the specified displacement and the collision severity is lower than the specified level.

2. The apparatus of claim 1, wherein the control circuit is configured to change a deployment condition of the airbag to adjust the deployment time point.

3. The apparatus of claim 2, wherein the control circuit is configured to deploy the airbag when the changed deployment condition is satisfied.

4. The apparatus of claim 1, wherein the specified displacement is set based on a displacement between the user and an interior material of the vehicle.

5. The apparatus of claim 1, further comprising a suspension, wherein the control circuit is configured to adjust a height of the suspension based on the predicted behavior.

6. The apparatus of claim 1, further comprising a power seat, wherein the control circuit is configured to adjust a location of the power seat based on the predicted behavior.

7. A method of controlling safety equipment of a vehicle, the safety equipment comprising an acceleration sensor, a collision detection sensor, a brake controller, a steering controller, an airbag, a seat belt actuator, and a seat belt, the method comprising:
    obtaining, by a control circuit of the vehicle, a longitudinal acceleration and a lateral acceleration, which are generated by a brake of the brake controller of the vehicle and a steering of the steering controller of the vehicle using the acceleration sensor of the vehicle; and
    calculating, by the control circuit of the vehicle, a predicted behavior of a user of the vehicle based on the longitudinal acceleration and the lateral acceleration;
    calculating, by the control circuit of the vehicle, a collision severity of the vehicle based on an acceleration obtained by the collision detection sensor;
    adjusting, by the control circuit of the vehicle, a deployment time point of the airbag when the predicted behavior is greater than a specified displacement and the collision severity is higher than a specified level;
    driving the seat belt actuator with a first driving force such that the seat belt of the vehicle is tightened when the predicted behavior is greater than the specified displacement and the collision severity is lower than a specified level; and driving the seat belt actuator with a second driving force lower than the first driving force when the predicted behavior is less than the specified displacement and the collision severity is lower than the specified level.

8. The method of claim 7, wherein the specified displacement is set based on a displacement between the user and an interior material of the vehicle.

9. An apparatus for use with a vehicle, the apparatus comprising:
- an acceleration sensor;
- a collision detection sensor;
- a brake controller;
- a steering controller;
- an airbag;
- a seat belt actuator;
- a suspension;
- a power seat; and
- a control circuit electrically connected to the acceleration sensor, the collision detection sensor, the brake controller, the steering controller, the airbag, and the seat belt actuator, wherein the control circuit is configured to:
  - obtain a longitudinal acceleration and a lateral acceleration, which are generated by a brake of the brake controller and a steering of the steering controller, using the acceleration sensor;
  - calculate a predicted behavior of a user of the vehicle based on the longitudinal acceleration and the lateral acceleration;
  - calculate a collision severity of the vehicle based on an acceleration obtained by the collision detection sensor;
  - adjust a deployment time point of the airbag when the predicted behavior is greater than a specified displacement and the collision severity is higher than a specified level;
  - drive the seat belt actuator with a first driving force such that a seat belt of the vehicle is tightened when the predicted behavior is greater than the specified displacement and the collision severity is lower than a specified level;
  - drive the seat belt actuator with a second driving force lower than the first driving force when the predicted behavior is less than the specified displacement and the collision severity is lower than the specified level;
  - adjust a height of the suspension based on the predicted behavior; and
  - adjust a location of the power seat based on the predicted behavior.

* * * * *